(12) United States Patent
Tinucci (10) Patent No.: US 7,221,832 B2
(45) Date of Patent: May 22, 2007

(54) FIBER OPTIC CABLE THERMAL PROTECTION DEVICE AND METHOD

(75) Inventor: Thomas Tinucci, Chaska, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 134 days.

(21) Appl. No.: 10/930,682

(22) Filed: Aug. 31, 2004

(65) Prior Publication Data

US 2006/0045440 A1 Mar. 2, 2006

(51) Int. Cl.
*G02B 6/44* (2006.01)

(52) U.S. Cl. .................. 385/106; 385/99; 385/112; 385/137

(58) Field of Classification Search ............... None
See application file for complete search history.

(56) References Cited

U.S. PATENT DOCUMENTS

| 5,675,681 | A * | 10/1997 | Chiaretti et al. ............. 385/59 |
| 6,081,641 | A | 6/2000 | Chen |
| 6,487,345 | B1 | 11/2002 | Dixon et al. |
| 6,496,625 | B1 | 12/2002 | Falkowich et al. |
| 6,690,866 | B2 | 2/2004 | Bonja et al. |
| 6,714,713 | B2 | 3/2004 | Lanier et al. |
| 6,801,695 | B2 | 10/2004 | Lanier et al. |
| 6,801,696 | B2 | 10/2004 | Davis et al. |
| 6,904,222 | B2 * | 6/2005 | Cooke et al. ............. 385/135 |
| 2001/0001623 | A1 * | 5/2001 | Inada et al. .................. 385/99 |
| 2004/0135737 | A1 * | 7/2004 | Finona et al. ............. 345/1.1 |

OTHER PUBLICATIONS

Exhibit 1 Color Copy of Photograph displaying a cluster of fiber optic splitters labeled "A".
Exhibit II FOnetworks, Inc. FOnetworks 6 and 12 Fiber Ribbon Fanout Assemblies; 3 pages total.
Exhibit III Time and Temperature Dependent Material Behavior and its Impact on Low Temperature Performance of Fiber Optic Cables, Materials Research Society Proceedings vol. 531, p. 333 (1998), 13 pages.

* cited by examiner

*Primary Examiner*—Kevin S Wood
*Assistant Examiner*—Jerry T Rahll
(74) *Attorney, Agent, or Firm*—Merchant & Gould P.C.

(57) ABSTRACT

A thermal protection device for a fiber optic cable includes a loop formed on the cable and a plurality of sub-units within the cable removed from an outer jacket. A circumferential cut is made through an outer jacket of each sub-unit. A tube is placed about the cut in each sub-unit. A carrier is positioned about each of the tubes and each sub-unit including a circumferential cut. A fiber optic system includes a thermal protection device for sub-units of a fiber optic cable within a frame. A method of providing thermal protection for a fiber optic cable. A kit for providing thermal protection to telecommunications cables.

40 Claims, 5 Drawing Sheets

FIBER OPTIC CABLE THERMAL PROTECTION DEVICE AND METHOD

TECHNICAL FIELD

The present invention generally relates to devices and methods for protecting fiber optic cables from damage or loss of performance due to changes in temperature.

BACKGROUND

Fiber optic cables generally include a fiber optic strand and one or more outerjackets. When the cable experiences temperature changes, one or more of the jackets can contract or expend at a different rate from the inner cable members, including the fiber strand. There is a need for devices and methods that reduce the effects of differential thermal expansion and contraction characteristics of the fiber optic cable.

In telecommunications networks installed in the field, it is known to have a large multi-fiber cable, such as an outside plant (OSP) cable, including multiple sub-units or cables within an outer jacket, with a strength member extending along with the sub-units. Each of these sub-units may include one or more optical fiber strands within an outer jacket. As the larger cable is extended throughout the area to which service is desired, at a plurality of fiber access enclosures, fiber strands in one or more of the sub-units with the larger cable may be extracted and spliced, or otherwise connected to a customer drop cable. The remaining sub-units within the larger cable continue on the route of the larger cable to be split off at a further fiber access enclosure. Those sub-units, which are passed through an enclosure with connecting to customer or other cables, are referred to as "expressed" sub-units.

Fiber access enclosures are often surface or pedestal mounted enclosures, subject to extremes of temperature due to the external environmental conditions. The materials in the sub-units, such as the fiber strands, the external jackets and potentially water blocking gel within the jacket about the fiber strands, may all react differently to exposure to these temperature extremes. For example, the jackets may contract more in cold temperatures than the relatively stable fiber strands. Differential contraction of the jacket with respect to the fiber strands can cause micro-bending of the fiber strands with the sub-units, leading to unacceptable attenuation losses with the fiber strands.

It is desirable to provide for the differential thermal expansion and contraction characteristics of the elements of the sub-units to be accommodated to reduce the level of attenuation induced by temperature extremes.

SUMMARY

The present invention relates generally to a device and method to provide thermal protection to a fiber optic cable. More specifically, the present invention relates to a fiber optic cable with a cable outer jacket and at least one sub-unit within the outer jacket. The sub-unit includes at least one optical fiber and a sub-unit outer jacket. At least one sub-unit is removed from the cable outer jacket. A circumferential cut through the sub-unit outer jacket is included in the sub-unit removed from the cable outer jacket. A tube is positioned about the sub-unit extending on either side of the circumferential cut and a carrier positioned about the sub-unit on both ends of the tube.

The present invention also relates to a system for providing thermal protection to a fiber optic cable including a frame with a cable entry and a cable exit. A fiber optic cable extends from the cable entry to the cable exit and forms a loop. The cable includes a cable outer jacket and at least one sub-unit, and the at least one sub-unit is removed from the cable outer jacket along the loop. Each of the at least one sub-units includes an outer jacket and at least one optical fiber, and a circumferential cut through the outer jacket fiber along the loop. A tube extends along a portion of the at least one sub-unit about the circumferential cut, and a carrier is positioned about the sub-unit about the tube.

The present invention further relates to a method of protecting a fiber optic cable including providing an optical fiber cable with a cable outer jacket and at least one sub-unit, each sub-unit including an outer jacket and at least one optical fiber. The optical fiber cable is extended into a loop. At least one sub-unit is removed from the cable outer jacket along the loop. A circumferential cut is made through the outer jacket of the at least one sub-unit along the loop. A tube is positioned about the at least one sub-unit over the circumferential cut, and the sub-unit and the tube about the sub-unit are placed within a carrier.

The present invention relates still further to a kit for providing thermal protection to a telecommunications cable including a carrier and a plurality of tubes. The carrier includes a base with opposing endplates. The endplates each include a plurality of slots for receiving the telecommunications cable. The tubes include a split from one end to an opposite end and are sized to be received about the telecommunications cable and between the endplates of the carrier.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows.

DETAILED DESCRIPTION OF THE PREFERRED EMBODIMENT

Reference will now be made in detail to the exemplary aspects of the present invention that are illustrated in the accompanying drawings. Wherever possible, the same reference numbers will be used throughout the drawings to refer to the same or like parts.

Figure 1:
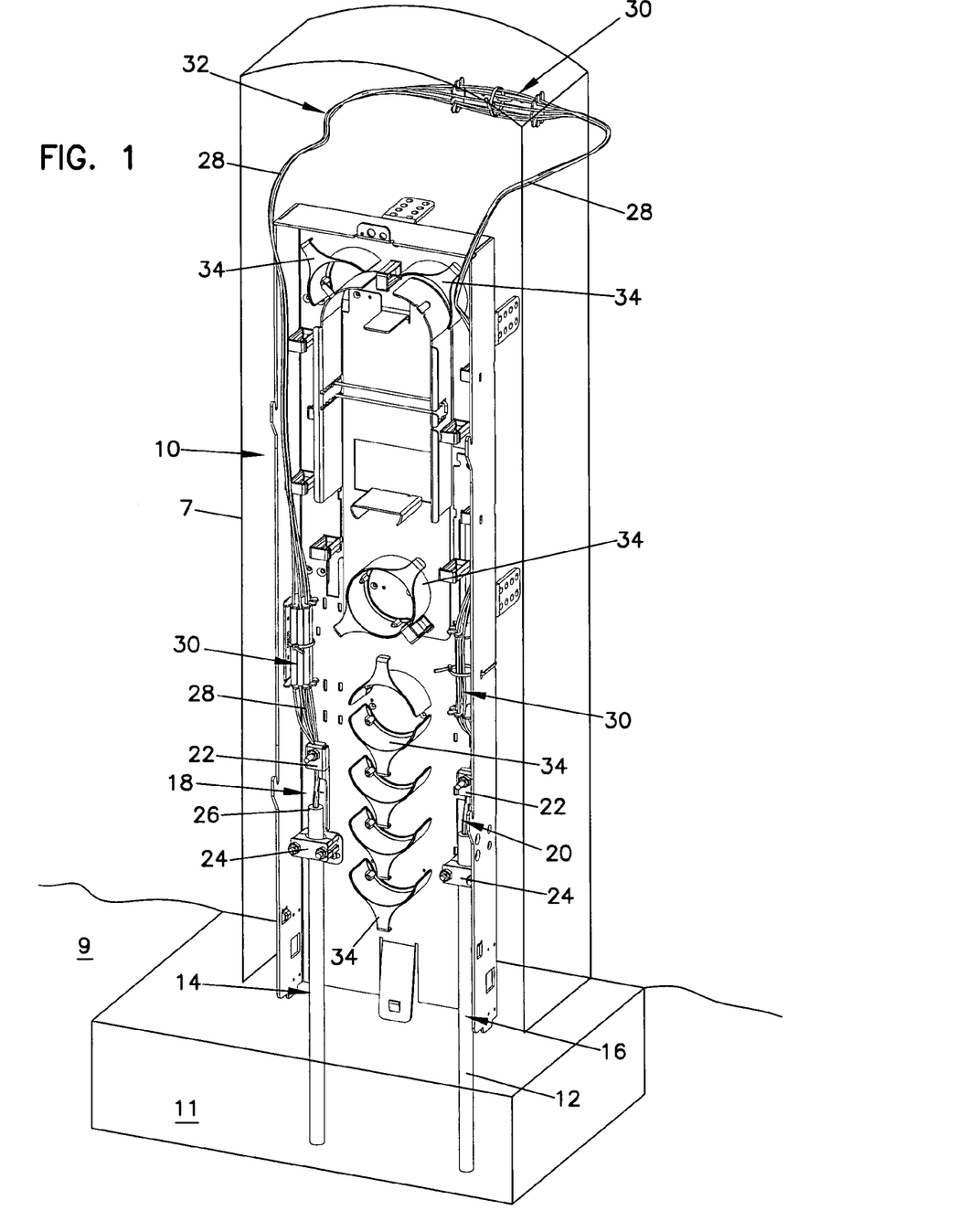
FIG. 1 is a perspective view of a frame for mounting fiber optic equipment within a fiber enclosure.

Fiber optic distribution and access termination enclosures are well known and provide an environmentally protected field installation to connect distribution optical fibers with customer drop cables. Inside these enclosures are typically frames to which different pieces of equipment for routing, splicing and connecting cables. FIG. 1 shows a frame 10 which may be mounted to a base 11 positioned in ground 9 and also mounted within an enclosure 7, shown schematically in FIG. 1. A multi-strand optical fiber distribution cable 12 passes through a first cable access 14 and a second cable access 16 for routing through several cable routing features 34 of frame 10. Adjacent first cable access 14 is a first cable clamp 18, and adjacent second cable access 16 is a second cable clamp 20. Each of the cable clamps 18 and 20 include a strength member clamp 22 and an outer jacket clamp 24 and provide a secure anchor for cable 12 at its entry and exit from frame 10.

Cable 12 includes an outer jacket 26 and a plurality of sub-units 28 (additional details of cable 12 are described below in FIGS. 2 and 3). Sub-units 28 are broken out from outer jacket 26 and a loop 32 of sub-units 28 extends between cable clamps 18 and 20. Adjacent each cable clamp 18 and 20 is a cable thermal expansion protection device 30. Another device 30 is positioned along loop 32 at approximately the mid-point of the loop. Within frame 10, one or more of the sub-units 28 may be split out of cable 12 above cable clamp 18 to be spliced or connected to customer drop cables, or to branch out from the enclosure to service customers who are not conveniently located to cable 12. The remaining sub-units 28 are passed or expressed through cable clamp 20 and out cable access 16, to transit to other enclosures or equipment further downstream in the network. Loop 32 includes those expressed sub-units 28.

Figure 2:
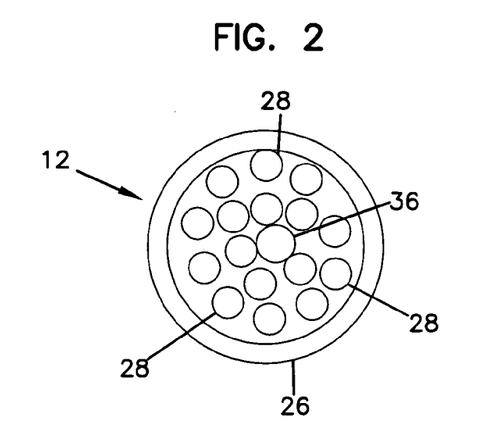
FIG. 2 is a cross-sectional view of a multi-strand fiber optic distribution cable.
Figure 3:
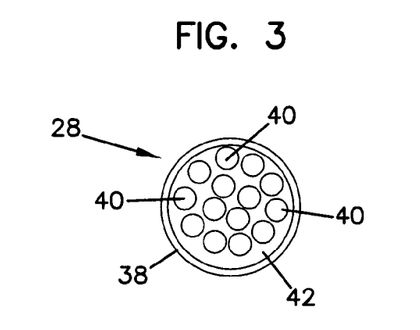
FIG. 3 is a cross-sectional view of a fiber optic sub-unit within the fiber optic distribution cable of FIG. 2.

FIG. 2 shows a cross-section of cable 12, with outer jacket 26 about sub-units 28. Cable 12 is shown as an outside plant (OSP) cable although other types and styles of multi-strand optical fiber cables may also be used. A central strength member 36 extends through cable 12. To extend cable 12 through frame 10, cable 12 may be clamped at outer jacket clamp 24 of one of the cable clamps 18 or 20. A sufficient length of cable 12 is drawn up to form the desired length of loop 32 and cable 12 is clamped at outer jacket clamp 24 of the other cable clamp. Outer jacket 26 of cable 12 is removed between outer jacket clamps 24 to expose sub-units 28 and central strength member 36. Strength member 36 may be extended to and clamped by each of the strength member clamps 22 and trimmed so that it does not extend along loop 32. Any sub-units 28 being split out for splicing, connecting or branching within frame 10 are also removed from loop 32 and the remaining sub-units 28 are the expressed sub-units.

Frame 10 and the enclosure in which it is mounted may be installed at a location exposed to the environment, including temperature extremes. Within each sub-unit 28, as shown in FIG. 3, may be an outer jacket 38 and a plurality of sheathed optical fibers 40. Filling the space about fibers 40 may be a water blocking gel to prevent water infiltration and migration within sub-unit 28. Fibers 40 and outer jacket 38 may have different coefficients of thermal expansion, so that each will elongate or contract different amounts in response to the temperature extremes. Fibers 40 may typically be more thermally stable than jacket 38. Thus, to accommodate elongation of jacket 38, fibers 40 are loosely and slidably positioned within sub-unit 28. This may provide enough excess fiber length to account for the additional elongation of jacket 38 without excessively tensioning fibers 40. However, when jacket 38 contracts, the excess fiber length within sub-unit 28 is increased to the extent that micro-bending may occur, resulting in undesirable and potentially unacceptable attenuation losses to signals transmitted through the fiber.

Figure 4:
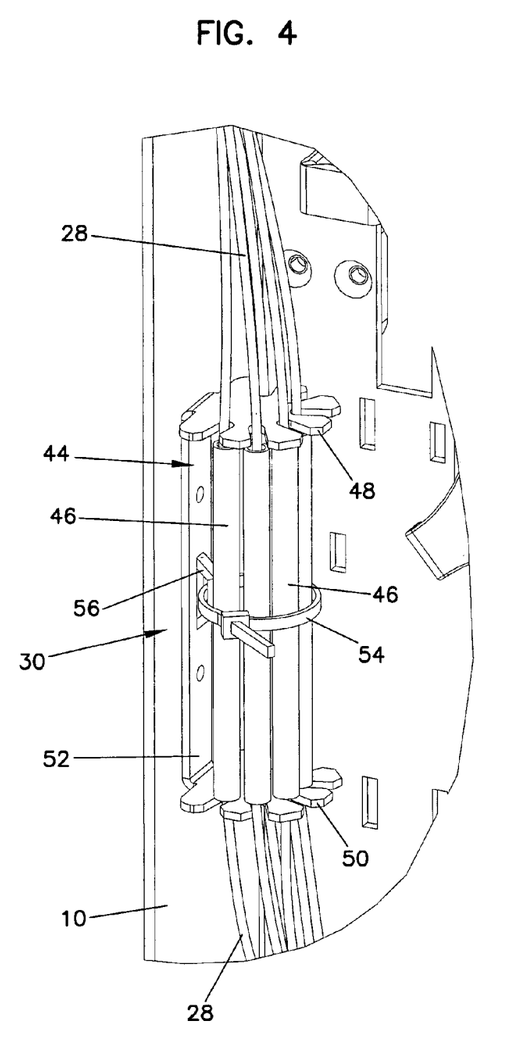
FIG. 4 is a closer view of a thermal protection device mounted within the frame of FIG. 1, with sub-units of a fiber optic distribution cable extending through the device.

Cable thermal protection device 30 permits the differential in thermal expansion and contraction of the elements of sub-units 28 to be compensated for to avoid excessive attenuation losses within fibers 40. Device 30 includes a carrier 44 through which the expressed sub-units extend through and each of the expressed sub-units is sheathed in a tube 46 within carrier 44. Carrier 44 includes a pair of opposing endplates 48 and 50 between which tubes 46 are captured. Carrier 44 also includes a base 52 that is mounted adjacent frame 10. A strap connector such as tie-wrap 54 extends about tubes 46 and sub-units 28, and through a loop 56 formed in base 52 to hold sub-units 28 and tubes 46 between endplates 48 and 50.

Figure 5:
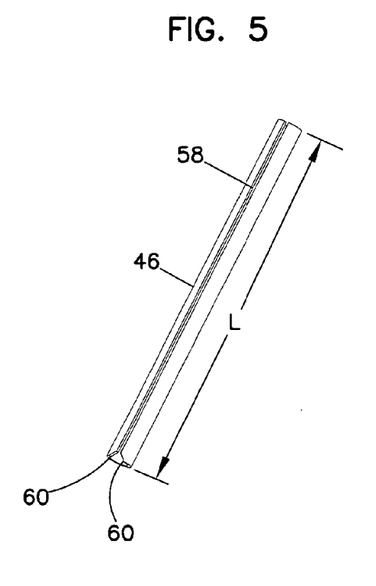
FIG. 5 is a tube for use with the thermal protection device of FIG. 4.

Tube 46 is illustrated in FIG. 5, and may include a split 58 extending the length of tube 46. At one end of tube 46, a chamfer 60 is formed on either side of split 58 to ease entry of sub-unit 28 into tube 46.

Figure 6:
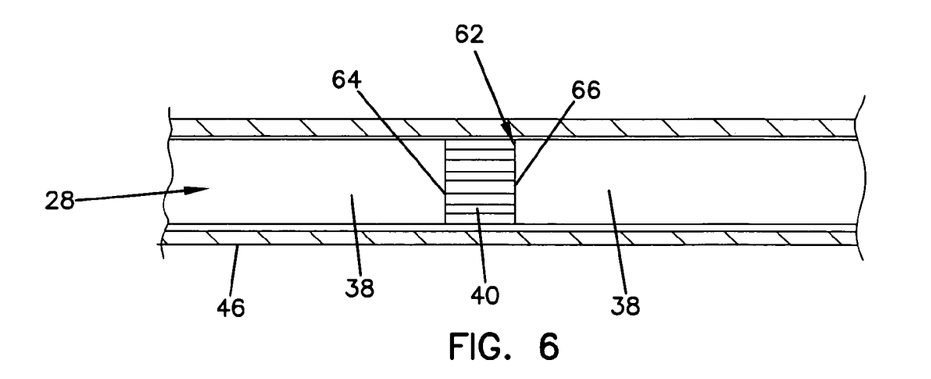
FIG. 6 is a partial cross-sectional side view of one of the sub-units of FIG. 3, with a portion of the tube removed.
Figure 7:
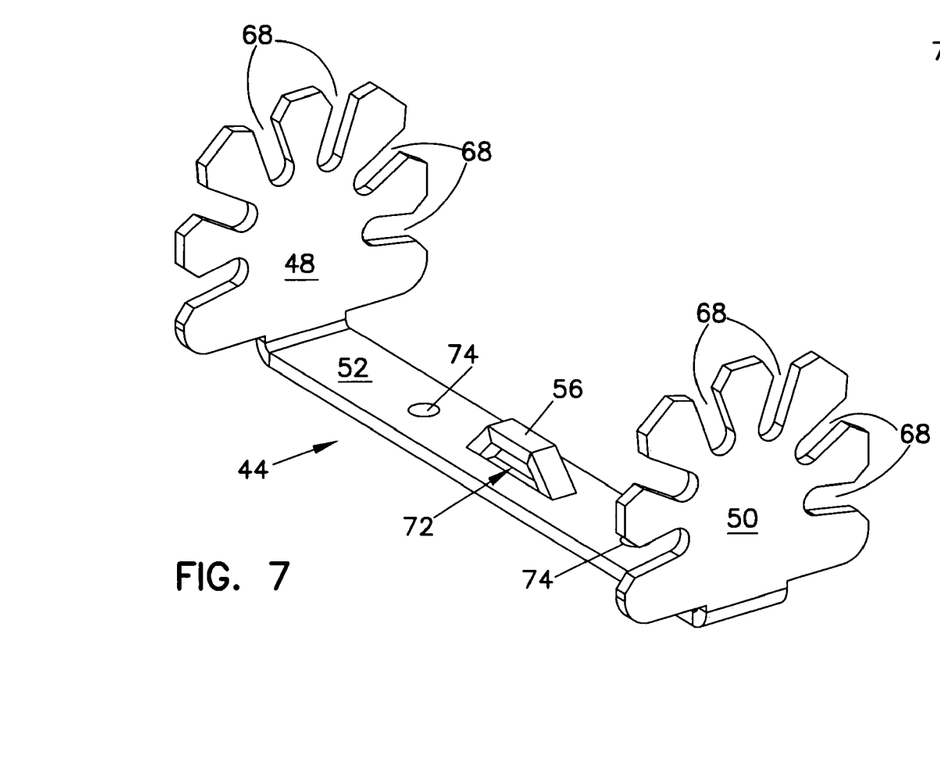
FIG. 7 is a perspective view of a carrier of the protective device of FIG. 4.
Figure 8:
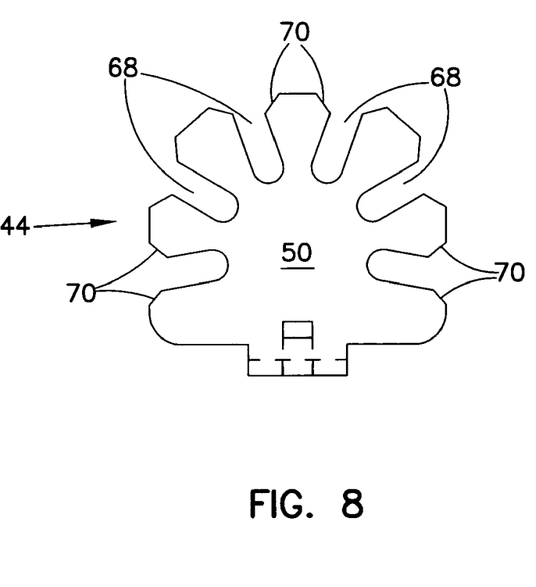
FIG. 8 is an end view of the carrier of FIG. 7.

FIG. 6 shows tube 46 with an expressed sub-unit 28. Within tube 46, a circumferential or ring cut 62 is made through outer jacket 38 of expressed sub-unit 28, creating two intermediate ends 64 and 66 of outerjacket 38 on either side of ring cut 62. This circumferential cut may be made with known products, such as the Cable Stripper, part number 45-463, made by IDEAL, and utilizing existing field practices. The cut does not extend through any portion of fiber 40. As fiber 40 is slidable within outerjacket 38, the cut permits outer jacket 38 and fibers 40 to contract independent of each other. As shown in FIG. 6, outer jacket 38 has contracted, pulling intermediate ends 64 and 66 away from each other. Fibers 40, which contract less, are free to slide within outer jacket 38 and leave a portion of fibers 40 exposed between the intermediate ends. This allows outer jacket 38 to contract in response to environmental conditions without causing undesirable attenuation within fibers 40. Where outer jacket 38 has pulled back along cut 62, fibers 40 are left without protection from flexing or damage that is normally provided by outer jacket 38. This exposure may leave fibers susceptible to damage or unacceptably sharp bends. Tube 46 extends along outer jacket 38 across cut 62 to provide the support to fibers 40 exposed by cut 62.

It is also known that some materials used to make outer jacket 38 will adopt a permanent set, or contracted length, after repeated exposure to temperature changes. Cut 62 allows these permanent sets to be compensated for as well. Cut 62 will also expose water blocking gel 42 within each sub-unit 28, potentially allowing the gel to escape from outerjacket 38. A close fit between tube 46 and outer jacket 38 may serve to reduce the amount of leakage of gel 42. However, as loop 32 is formed in a sealed enclosure within which frame 10 is mounted, so that the chance of water infiltration is relatively minor and the escape of a portion of gel 42 is acceptable.

Several devices 30 may be mounted along loop 32 within frame 10, although the number of devices required may vary with the length and thermal characteristics of loop 32. Loop 32 may be short enough, or the difference in thermal coefficients of expansion may be small enough that only a single device 30 is required. Added length of loop 32, or greater differences in the thermal coefficients of expansion of outer jacket 38 and fibers 40 may call for additional devices 30 along loop 32.

Loop 32 is preferably sized so that loop 32 can by folded back on itself to lie within frame 10 so that an enclosure can be positioned about frame 10. In such a folded over configuration, the mid-loop mounted device 30 would lie adjacent one of the lower mounted cable routing features 34 on frame 10. It is anticipated that a ribbon cable or other forms of multi-strand fiber optic distribution cables may used with the thermal protection device shown herein.

FIGS. 7 to 10 show carrier 44 with endplates 48 and 50 and base 52. Endplates 48 and 50 each include a plurality of slots 68 for receiving sub-units 28. Slots 68 are deep enough to hold at least one sub-unit 28, and may be configured to hold more than one, depending on the number of sub-units being expressed through a particular frame 10. Slots 68 are also narrow enough to prevent passage of tube 46 along the length of any of the sub-units 28 within a slot 68. This will prevent any unwanted sliding or migration of tubes 46 from about cuts 62 in sub-units 28. Each slot 68 may include one or a pair of tapered entries 70 to aid in the positioning of sub-units within the slot. However, it may be desirable for slots 68 to be configured with a uniform width, for example, if slots 68 are configured to hold two sub-units, or if endplates 48 and 50 were made smaller and the overall depth of any slot 68 was closer to the size of a sub-unit, or for other reasons. Loop 56 in base 52 defines an opening 72 to receive tie-wrap 54 or some other form of holddown or strap connector to secure sub-units to device 30. A pair of fastener openings 74 is included in base 52 to aid in mounting of device 30 to frame 10. It is also anticipated that an adhesive may be used to mount device 30.

Figure 9:
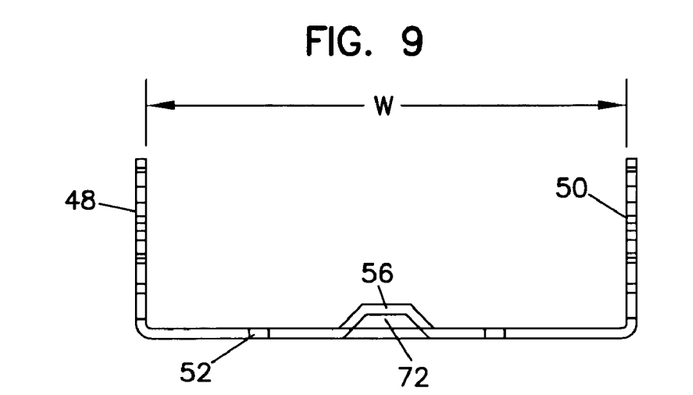
FIG. 9 is a side view of the carrier of FIG. 7.
Figure 10:
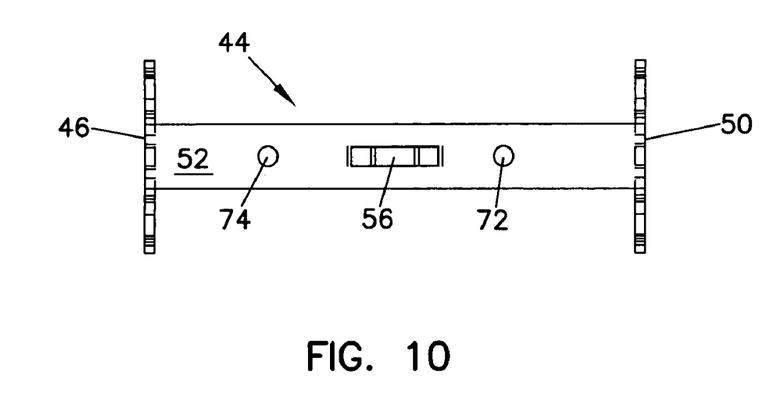
FIG. 10 is a top view of the carrier of FIG. 7.

Referring now to FIGS. 5 and 9, carrier 44 defines a width W between endplates 48 and 50. This width W is preferably closely matched and slightly greater than a length L of tube 46. Length L should be sufficiently long to cover any expected separation between intermediate ends 64 and 66 and extend from cut 62 along a portion of outerjacket 38 adjacent cut 62 to provide the desired support to any exposed fibers 40 of sub-unit 28. This desired length L may change due to the thermal characteristics of sub-units 28 and length of loop 32 but may not exceed width W. When the desired length L approaches width W, an additional thermal protective device 30 should be included in loop 32. For the anticipated length of loop 32 shown and described above, it is anticipated that three devices 30 will be desirable to provide adequate thermal and other protection to the fibers within sub-units 28. It is anticipated that the device 30 positioned mid-loop along loop 32 will not be fastened or mounted to frame 10 but will be attached only to sub-units 28, providing improved future access to frame 10 as loop 32 can be moved away from frame 10, as shown in FIG. 1.

The embodiments of the inventions disclosed herein have been discussed for the purpose of familiarizing the reader with novel aspects of the present invention. Although preferred embodiments have been shown and described, many changes, modifications, and substitutions may be made by one having skill in the art without unnecessarily departing from the spirit and scope of the present invention. Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A fiber optic cable comprising:
a cable outer jacket and at least one sub-unit, the at least one sub-unit including at least one optical fiber and a sub-unit outer jacket;
at least one sub-unit removed from the cable outer jacket;
the sub-unit removed from the cable outer jacket including a circumferential cut through the sub-unit outer jacket;
a tube positioned about the sub-unit extending on either side of the circumferential cut;
a carrier positioned about the sub-unit on both ends of the tube;
wherein the cable is formed into a loop, the cable outer jacket is removed from the sub-units along the loop and the at least one sub-unit extends along the loop, and the at least one sub-unit includes a plurality of circumferential cuts, with a tube mounted about each cut and a carrier mounted about each tube, and the fiber optic cable further includes a longitudinally extending strength member along which the at least one sub-unit extends within the cable outer jacket, wherein the strength member has been removed along the loop.

2. A fiber optic cable comprising:
a cable outer jacket and a plurality of sub-units, the at least one sub-unit including at least one optical fiber and a sub-unit outer jacket;
at least one sub-unit removed from the cable outer jacket;
the sub-unit removed from the cable outerjacket including a circumferential cut through the sub-unit outer jacket;
a tube positioned about the sub-unit extending on either side of the circumferential cut; and
a carrier positioned about the sub-unit on both ends of the tube;
wherein the cable is formed into a loop, the cable outer jacket is removed from the sub-units along the loop and the plurality of sub-units extend along the loop, and each sub-unit along the loop includes a plurality of circumferential cuts, with a tube mounted about each cut and a carrier mounted about each tube, and the fiber optic cable further includes a longitudinally extending strength member along which the plurality of sub-units extend within the cable outer jacket, wherein the strength member has been removed along the loop.

3. A fiber optic cable comprising:
a cable outer jacket and at least one sub-unit, the at least one sub-unit including at least one continuous optical fiber and a sub-unit outer jacket;
at least one sub-unit removed from the cable outer jacket;
the sub-unit removed from the cable outer jacket including a circumferential cut through the sub-unit outer jacket at a location along a length of the continuous optical fiber;
a tube positioned about the sub-unit extending on either side of the circumferential cut; and
a carrier positioned about the sub-unit on both ends of the tube;
wherein the cable is formed into a loop, the cable outer jacket is removed from the sub-units along the loop and the at least one sub-unit extends along the loop, and the at least one sub-unit includes a plurality of circumferential cuts, with a tube mounted about each cut and a carrier mounted about each tube, and the fiber optic cable further includes a longitudinally extending strength member along which the at least one sub-unit extends within the cable outer jacket, wherein the strength member has been removed along the loop.

4. The fiber optic cable of claim 3, further comprising a longitudinally extending strength member within the cable outer jacket.

5. The fiber optic cable of claim 3, wherein the carrier includes a pair of opposing endplates, each endplate including a plurality of slots sized to receive one of the at least one sub-units.

6. The fiber optic cable of claim 5, wherein the endplates of the carrier are spaced apart a width greater than a length of the tube, the at least one sub-unit is positioned within one of the slots of each endplate, and the tube is positioned about the sub-unit between the endplates of the carrier.

7. The fiber optic cable of claim 3, wherein the tube includes a longitudinally extending split extending from one end of the tube to an opposite end of the tube.

8. The fiber optic cable of claim 7, wherein the split in the tube adjacent one end of the tube includes a chamfered opening to the split.

9. The fiber optic cable of claim 3, wherein the cable includes a plurality of sub-units.

10. The fiber optic cable of claim 9, wherein a plurality of sub-units is removed from the cable outer jacket, each sub-units including a circumferential cut, a tube positioned about the sub-unit about the cut and a carrier positioned about the sub-unit on either end of the tube.

11. The fiber optic cable of claim 10, wherein each tube includes a longitudinally extending split extending from one end of the tube to an opposite end of the tube.

12. The fiber optic cable of claim 11, wherein the split in the tube adjacent one end of the tube includes a chamfered opening to the split.

13. The fiber optic cable of claim 9, wherein the carrier includes a pair of opposing endplates, each endplate including a plurality of slots sized to receive the plurality of sub-units.

14. The fiber optic cable of claim 13, wherein the endplates of the carrier are spaced apart a width greater than a length of the tube, each of the plurality of sub-units is positioned within one of the slots of each endplate, and one of the tubes is positioned about each sub-unit between the endplates of the carrier.

15. The fiber optic cable of claim 9, wherein the cable is formed into a loop, the cable outer jacket is removed from the sub-units along the loop and the plurality of sub-units extend along the loop, and each sub-unit along the loop includes a plurality of circumferential cuts, with a tube mounted about each cut and a carrier mounted about each tube.

16. The fiber optic cable of claim 15, further comprising a longitudinally extending strength member along which the plurality of sub-units extend within the cable outer jacket, wherein the strength member has been removed along the loop.

17. The fiber optic cable of claim 9, further comprising a longitudinally extending strength member within the cable outer jacket.

18. A fiber optic cable system comprising:
 a frame with a cable entry and a cable exit;
 a fiber optic cable extending from the cable entry to the cable exit and forming a loop, the cable including a cable outer jacket and at least one sub-unit, the at least one sub-unit removed from the cable outer jacket along the loop;
 each of the at least one sub-units including an outer jacket and at least one optical fiber, and a circumferential cut through the outer jacket;
 a tube extending along a portion of the at least one sub-unit about the circumferential cut;
 a carrier positioned about the sub-unit about the tube;
 a plurality of sub-units extending along the loop, each sub-unit including a circumferential cut through the outer jacket, a tube extending along the sub-unit about the circumferential cut, and a carrier positioned about the sub-unit about the tube; and
 a longitudinally extending strength member within the cable outer jacket of the fiber optic cable adjacent the sub-units, the frame including a strength member cable clamp adjacent each of the outer jacket cable clamps, and the strength member of the fiber optic cable clamped by the strength member cable clamps.

19. The fiber optic cable system of claim 18, wherein the strength member is removed from the loop between the strength member cable clamps.

20. A fiber optic cable system comprising:
 a frame with a cable entry and a cable exit;
 a fiber optic cable extending from the cable entry to the cable exit and forming a loop, the cable including a cable outer jacket and at least one sub-unit, the at least one sub-unit removed from the cable outer jacket along the loop;
 each of the at least one sub-units including an outer jacket and at least one optical fiber, and a circumferential cut through the outer jacket, wherein the at least one optical fiber extends unbroken along a length of the cable between the cable entry and the cable exit;
 a tube extending along a portion of the at least one sub-unit about the circumferential cut; and
 a carrier positioned about the sub-unit about the tube;
 an outer jacket cable clamp adjacent each of the cable entry and the cable exit, the cable outer jacket of the fiber optic cable held by the outer jacket cable clamp; and
 a longitudinally extending strength member within the cable outer jacket of the fiber optic cable adjacent the sub-units, the frame including a strength member cable clamp adjacent each of the outer jacket cable clamps, and the strength member of the fiber optic cable clamped by the strength member cable clamps.

21. The fiber optical cables system of claim 20, wherein the strength member is removed from the loop between the strength member cable clamps.

22. The fiber optic cable system of claim 20, wherein the tube includes a longitudinal split through which may be passed over the sub-unit to position the tube about the circumferential cut in the sub-unit.

23. The fiber optic cable system of claim 22, wherein the longitudinal split in the tube includes a chamfered entry at one end of the tube.

24. The fiber optic cable system of claim 20, wherein the carrier includes a base connecting a pair of opposing endplates and the tube about the sub-unit is positioned between the endplates.

25. The fiber optic cable system of claim 20, wherein the sub-units within the loop each include a plurality of circumferential cuts spaced between the cable entry and cable exit, with a tube positioned about each circumferential cut and a carrier positioned about each tube.

26. The fiber optic cable system of claim 20, further comprising a plurality of sub-units extending along the loop, each sub-unit including a circumferential cut through the outer jacket, a tube extending along the sub-unit about the circumferential cut, and a carrier positioned about the sub-unit about the tube.

27. The fiber optic cable system of claim 26, wherein the carrier includes a base connecting a pair of opposing endplates and the tube about the sub-unit is positioned between the endplates.

28. The fiber optic cable system of claim 26, further comprising a longitudinally extending strength member within the cable outer jacket of the fiber optic cable adjacent the sub-units, the frame including a strength member cable clamp adjacent each of the outer jacket cable clamps, and the strength member of the fiber optic cable clamped by the strength member cable clamps.

29. The fiber optic cable system of claim 28, wherein the strength member is removed from the loop between the strength member cable clamps.

30. The fiber optic cable system of claim 26, wherein the tube about each sub-unit includes a longitudinal split through which extends from one end of the tube to an opposite end of the tube.

31. The fiber optic cable system of claim 30, wherein the longitudinal split in the tube includes a chamfered entry at one end of the tube.

32. The fiber optic cable system of claim 26, further comprising an outer jacket cable clamp adjacent each of the cable entry and the cable exit, the cable outer jacket of the fiber optic cable held by the outer jacket cable clamp.

33. A fiber optic cable comprising:
a cable outer jacket and at least one sub-unit, the at least one sub-unit including at least one continuous optical fiber and a sub-unit outer jacket;
at least one sub-unit removed from the cable outer jacket;
the sub-unit removed from the cable outer jacket including a circumferential cut through the sub-unit outer jacket at a location along a length of the continuous optical fiber;
a tube positioned about the sub-unit extending on either side of the circumferential cut; and
a carrier positioned about the sub-unit on both ends of the tube;
wherein the cable is formed into a loop, the cable outer jacket is removed from the sub-units along the loop and the plurality of sub-units extend along the loop, and each sub-unit along the loop includes a plurality of circumferential cuts, with a tube mounted about each cut and a carrier mounted about each tube, and the fiber optic cable further includes a longitudinally extending strength member along which the plurality of sub-units extend within the cable outer jacket, wherein the strength member has been removed along the loop.

34. A fiber optic cable system comprising:
a frame with a cable entry and a cable exit;
a fiber optic cable extending from the cable entry to the cable exit and forming a loop, the cable including a cable outer jacket and at least one sub-unit, the at least one sub-unit removed from the cable outer jacket along the loop;
each of the at least one sub-units including an outer jacket and at least one optical fiber, and a circumferential cut through the outer jacket, wherein the at least one optical fiber extends unbroken along a length of the cable between the cable entry and the cable exit;
a tube extending along a portion of the at least one sub-unit about the circumferential cut; and
a carrier positioned about the sub-unit about the tube;
a plurality of sub-units extending along the loop, each sub-unit including a circumferential cut through the outer jacket, a tube extending along the sub-unit about the circumferential cut, and a carrier positioned about the sub-unit about the tube; and
a longitudinally extending strength member within the cable outer jacket of the fiber optic cable adjacent the sub-units, the frame including a strength member cable clamp adjacent each of the outer jacket cable clamps, and the strength member of the fiber optic cable clamped by the strength member cable clamps.

35. The fiber optic cable system of claim 34, wherein the strength member is removed from the loop between the strength member cable clamps.

36. A fiber optic cable system comprising:
a frame with a cable entry and a cable exit;
a fiber optic cable extending from the cable entry to the cable exit and forming a loop, the cable including a cable outer jacket and at least one sub-unit, the at least one sub-unit removed from the cable outerjacket along the loop;
each of the at least one sub-units including an outer jacket and at least one optical fiber, and a circumferential cut through the outer jacket;
a tube extending along a portion of the at least one sub-unit about the circumferential cut;
a carrier positioned about the sub-unit about the tube;
an outer jacket cable clamp adjacent each of the cable entry and the cable exit, the cable outer jacket of the fiber optic cable held by the outer jacket cable clamp; and
a longitudinally extending strength member within the cable outer jacket of the fiber optic cable adjacent the sub-units, the frame including a strength member cable clamp adjacent each of the outer jacket cable clamps, and the strength member of the fiber optic cable clamped by the strength member cable clamps.

37. The fiber optic cable system of claim 36, wherein the strength member is removed from the loop between the strength member cable clamps.

38. A kit for providing thermal protection to a telecommunications cable, the kit comprising:
a carrier with a base and endplates extending upward from opposite ends of the base, each of the endplates including a plurality of slots sized to receive the telecommunications cable;
a plurality of tubes, each tube including a split from one end to a second opposite end, and each tube sized to be received about telecommunications cable and between the endplates of the carrier; and
a plurality of holes in the base for mounting the carrier to a frame.

39. The kit of claim 38, wherein the slots are arranged in a generally circular pattern about each of the endplates.

40. The kit of claim 38, further comprising a tie bar on the base.

* * * * *